Nov. 20, 1945.  L. J. KMIECIK  2,389,437

TEMPERATURE RELIEF VALVE

Filed June 21, 1943

INVENTOR.
Leo J. Kmiecik,
BY
Brown Jackson Boettcher Dienner
Attys.

Patented Nov. 20, 1945

2,389,437

UNITED STATES PATENT OFFICE 2,389,437

TEMPERATURE RELIEF VALVE

Leo J. Kmiecik, Chicago, Ill., assignor to Everett N. McDonnell, Chicago, Ill.

Application June 21, 1943, Serial No. 491,600

2 Claims. (Cl. 236—80)

The present invention relates to an improvement in a relief valve adapted to function in response to a predetermined temperature.

The present disclosure is made with reference to use of my improved relief valve in connection with range boilers, tank and heaters in which it is desirable to keep the temperature in the vessel below 210° F. to avoid the danger of explosion. Excessive temperature in vessels of the character referred to are particularly dangerous in that when the temperatures exceed 212° F. an explosion will occur the extent of which is dependent upon the degree of temperature above 212° F. In valves of the prior art thermally responsive means have been provided for opening a main valve between the inlet and outlet of a valve housing, but these prior valves are defective in that the temperature responsive means must open the main valve which is of large area against the force of the spring designed to seat the valve against a certain predetermined pressure. At present flexible bellows filled with a liquid or gas expansible upon temperature increases are employed as the temperature responsive means, and the difficulty encountered lies in providing such a bellows having sufficient power to open the large main valves and still have a reasonable length of life or period of usefulness. A large bellows is required since it must operate to open a large main valve against the force of a heavy spring tending to close the valve. These large bellows are expensive and since they frequently fail after a short time the cost of maintenance is excessive. Ordinarily a hollow rod containing the expansible gas or liquid is connected to a bellows of the character referred to and extends into the chamber of the vessel in which the temperature is to be controlled. Frequently the closed ends of these tubes will blow out due to expansion of the fluid in the rod and bellows before the bellows can overcome the force of the large main springs provided for seating the main valve. In tanks and heaters pressure is ordinarily of minor consideration in that the rate of expansion from room temperature to 212° F. is about 4% in volume so that in the particular use of the valve for such purposes the pressure relief can be quite small if an adequate temperature relief is provided. If desired, a separate and independent pressure relief valve may be provided to take care of excess pressure conditions which may develop in the vessel.

It is an object of my invention to provide a relief valve utilizing a small bellows responsive to temperature for controlling a small pilot valve, together with suitable means operative upon opening of the pilot valve to open a main valve between the inlet and outlet of the release valve housing.

According to my invention I propose to provide a valve housing having an inlet and an outlet with a main valve and seat therefor between the inlet and outlet. The main valve preferably is carried by a carriage means which is provided with a suitable chamber expansible by pressure, such as a large flexible bellows. A second valve, or pilot valve, may be carried within the expansible chamber and cooperates with a pilot valve seat formed in the carriage means. A spring member normally seats the pilot valve upon its seat. The pilot valve orifice is of small cross-sectional area and the pilot valve may be maintained seated by a light spring against pressures of the order of 50 to 150 lbs. per square inch in the boiler or other vessel with which the valve is installed. A temperature responsive device, such as a small bellows highly sensitive to temperature change, in the preferred embodiment of the invention, is disposed within a chamber formed in the carriage and from which extends a tube or hollow rod containing a liquid or vapor which upon creation of a temperature condition in excess of the predetermined temperature causes expansion of the bellows to unseat the pilot valve against the spring tending to seat it. A small bellows is capable of readily unseating the pilot valve since it is normally urged to its seated position by means of the light spring. Upon opening of the pilot valve pressure of the fluid within the vessel is admitted therethrough into the expansible chamber and the pressure acting upon the relatively large area of the expansible chamber expands the same urging the carriage secured thereto in a direction to open the main valve, and maintaining the main valve open until the thermally responsive device permits the pilot valve to again seat. In the preferred form of my device a vent or small bleed port is formed in the expansible chamber to establish communication between it and the outlet of the valve housing so that upon very slight increases of temperature tending to open the pilot valve, the pressure will be relieved through the bleed port and will not cause opening of the main valve. In the preferred embodiment of my invention, the main valve is disposed in the inlet compartment of the valve housing to cooperate with a valve seat extending into the inlet compartment so that normally the main valve is caused to be seated by the pressure in the inlet compartment. In addition spring means is provided and is assembled to normally urge the carriage means carrying the main valve to seat upon its seat. It will thus be observed that I have provided a novel form of pop valve which opens against pressure in the inlet compartment of the valve housing. This is an unusual characteristic in temperature relief valves. Other objects and advantages of my invention will be apparent from the detailed description.

Now, in order to acquaint those skilled in the art with the manner of construction and utilizing a device in accordance with my invention, I shall describe in conjunction with the accompanying drawing a preferred embodiment of the same.

Figure 1:
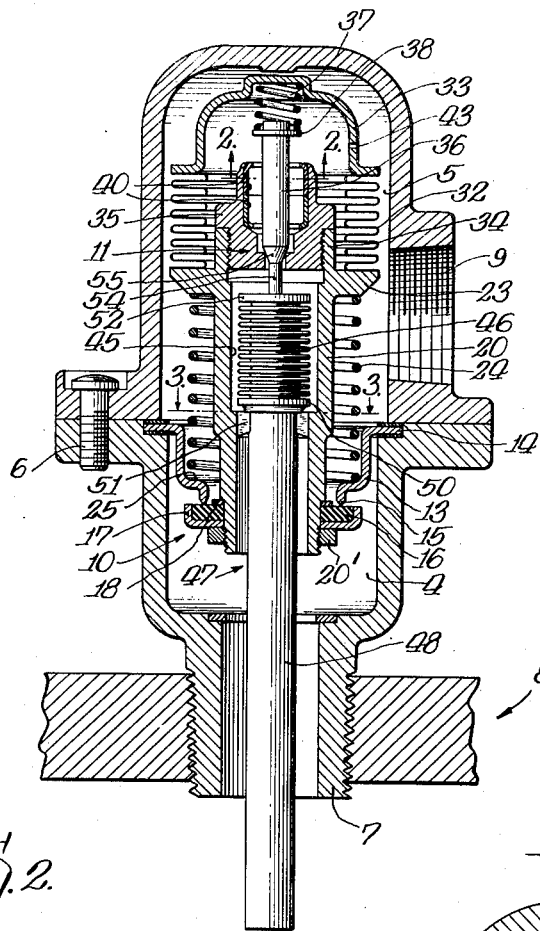
Figure 1 is a vertical detail sectional view of my improved valve.

Referring now to the drawing, it will be seen that the valve housing comprises an inlet compartment 4 and an outlet compartment 5 which are secured together by a plurality of bolts 6, only one of which is shown in the drawing. The inlet compartment 4 is provided with a threaded extension 7 for assembling it in a vessel 8. It will be understood that the vessel with which the valve is associated may comprise a range boiler, tank, heater or other apparatus in which it is desired to control the temperature. The compartment 5 is provided with an outlet 9 to which a suitable conduit may be secured for discharging the relieved fluid to waste or otherwise dispose of it.

Figure 2:
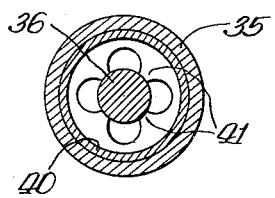
Figure 2 is a detail horizontal sectional view taken on the line 2—2 of Figure 1 looking in the direction indicated by the arrows.
Figure 3:
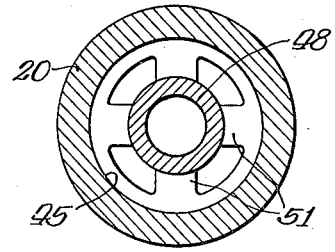
Figure 3 is a detail horizontal sectional view taken on the line 3—3 of Figure 1 looking in the direction indicated by the arrows.

The main valve of the valve assembly is indicated generally at 10 and the relief or pilot valve assembly is indicated generally at 11. The valve seat for the main valve is formed by valve seat member 13 which is of cup-shape and is provided with an annular flange 14 which is adapted to be seated in an annular recess formed in the upper end of the inlet compartment 4 and secured therein by the bottom portion of the upper compartment 5. If desired suitable packing may be inserted between the annular flange 14 of the seat member 13 between the adjacent portions of the upper and lower compartments of the valve housing to provide a fluid tight joint. The valve seat member 13 is formed with a valve seat 15 defined by downwardly converging side walls to provide a seat having substantially line contact with a composite material seat 16 carried by the cup-shaped annular valve 17. A valve carriage member 20 is disposed within the valve housing and as shown in the drawing is threaded at its lower end to receive a nut 20' for securing the valve element 17 and the composite seat 16 between the nut and a washer 18 bearing against a shoulder in the lower end of the carriage. It will be observed that the valve seat 15 extends inwardly into the inlet compartment 4, and that the valve formed by the composite material 16 and the annular valve flange member 17 is disposed within the inlet compartment so that the pressure in the vessel 8 normally acts to seat the valve upon its seat. Adjacent its upper end the valve carriage member 20 is provided with an enlarged annular flange 23, and a valve seating spring 24 seats at one end against the lower face of the annular flange 23 and the wall 25 of the valve seat member 13. The spring 24 is a light spring and functions to return the main valve to its seat 15 after a temperature or pressure condition which has opened the main valve has been relieved. A large flexible bellows 32 for opening the main valve 10 is suitably secured at one end to the upper face of the annular flange 23 and at its other end is secured to a cap member 33. The flexible bellows 32 and the cap member 33 together form an expansible chamber carried by the carriage 20. The carriage 20 is provided at its upper end with a reduced annular portion 34 which is internally threaded to receive a pilot valve seat member 35. A pilot valve member 36 for the pilot valve seat of member 35 is normally urged in seated position by a spring 37 which seats at one end against a washer 38 suitably fixed to the upper end of the pilot valve member 36 and an annular recess 39 formed in the upper end of the cap member 33. A guide comprising a pair of cup-shaped members 40 is assembled in the upper portion of the valve seat member 35 each of the cup members 40 being formed with fingers 41 adapted to have guiding contant with the stem of the pilot valve member 36 as will be clear from Figure 2. A relief port or bleed 43 is formed in the cap member 33 and establishes communication between the expansible chamber and the outlet compartment of the valve housing.

The carriage 20 is formed with an internal bore 45 defining a compartment in which is disposed the small flexible bellows 46 of a temperature responsive device 47. The temperature responsive device further comprises a tube or hollow rod 48 extending through the lower portion of the carriage 20, the inlet compartment 4 through the opening in the extension 7 and into the vessel 8, the temperature of which is to be controlled. The tube 48 is charged with fluid or vapor expansible upon rise in temperature so that upon increase of temperature in the vessel 8 beyond a predetermined degree bellows 46 is caused to be expanded. The bellows is formed at its lower end with a flange member 50 which seats upon the fingers of a seat member 51 which is rigid with the carriage 20. The upper end of the bellows 46 has secured thereto a flange 52 from which extends a shaft 54 preferably formed integral with the pilot valve member 36. The diameter of the shaft 54 is less than that of the upper portion of the pilot valve member 36 and are joined by a frusto-conical portion 55 forming a conical pilot valve for the pilot valve seat in the valve member 35.

Now upon an increase in temperature above a predetermined degree, for example, 210° F. the bellows 46 is caused to be expanded by expansion of the fluid or vapor in the tube 48 which overcomes the force of spring 37 to open the pilot valve member whereupon admission of the fluid from the vessel 8 into the expansible chamber will cause the bellows 32 to expand. Since the cap member is in an abutment with the upper end wall of the compartment 5 and the area of the expansible chamber is considerably in excess of that of the area of the main valve 10 exposed to the pressure of the fluid in the vessel 8, the main valve 10 will be opened against the pressure in the inlet compartment and the force of the spring 24 establishing communication between the inlet and outlet compartments of the valve housing. It will thus be seen that the temperature expansion device 46 acts only to open the pilot valve and that the main valve 10 establishing communication between the inlet and outlet of the valve housing is effected by the large bellows 32 which possesses sufficient mechanical strength for that purpose. The valve will remain open as long as the excessive temperature condition persists. When the temperature drops to the desired value, the flexible bellows 46 collapses causing pilot valve 55 to seat whereupon pressure within the expansible chamber will be dissipated through the bleed port 43 so that the pressure within the vessel 8 and the valve seating spring 24 will urge the main valve 10 to its seated position. In the valve of my present invention, pressure within the vessel 8 of an amount capable of opening the pilot valve 36 against the force of the spring 37 cannot affect opening of the main valve 10. When a pressure condition within the vessel 8 occurs opening pilot valve 36 the pressure within the expansible chamber comprising the cap member 33 and bellows 32 permits the force of spring 37 to cause the pilot valve to seat. The pressure within the expansible chamber upon opening of the pilot valve is less than the pressure in the inlet of the valve housing because of the bleed port 43. However this reduced pressure although acting upon the greater area of the expansible chamber is not sufficient to open main valve 10 in that the spring 37 provides sufficient force to close the pilot valve 36. Excessive pressure in the vessel 8 will cause the intermittent opening and closing of the pilot valve and a leaking of fluid therethrough. The spring 37 is of a strength to maintain the pilot valve seated against normal operating pressures of the vessel 8. In boilers and the like the operating pressures may range from 50 to 150 lbs. per square inch, which due to the small orifice of the pilot port requires only a very light spring to maintain the pilot valve 38 seated. It will be observed therefore that an excessive pressure condition in the vessel 8 of itself cannot cause opening of the main valve 10.

While I have shown what I consider to be the preferred embodiment of my invention it will be understood that various arrangements and modifications may be made therein without departing from the spirit and scope of my invention.

I claim:

1. A temperature relief valve comprising, a valve housing having an inlet compartment and an outlet compartment, a main valve member in said housing and having a main valve seat extending into the inlet compartment of said valve housing, a hollow carriage member in said valve housing having one end extending beyond said valve seat of said main valve member into said inlet compartment, a main valve at said one end of said carriage member, a spring between said main valve seat member and said carriage member for normally urging the latter in a direction to seat said main valve on said main valve seat, an expansible chamber comprising a flexible bellows at the other end of said carriage member, a pilot valve seat at said other end of said carriage member opening into said expansible chamber, a temperature responsive means having a flexible bellows disposed within said carriage member and subject to the temperature of the fluid in said inlet compartment, a pilot valve at the other end of said flexible bellows of said temperature responsive means, spring means between said pilot valve and said expansible chamber for normally seating said pilot valve on said pilot valve seat, the cross-sectional area of the opening of said pilot valve seat being substantially less than the cross-sectional area of the opening of said main valve seat, said flexible bellows of said temperature responsive means at a predetermined temperature being adapted to expand to unseat said pilot valve and admit pressure from said inlet compartment into said expansible chamber, said expansible chamber having an effective area against which pressure admitted therein acts of substantially greater area than the area of said main valve subject to the pressure in said inlet compartment, whereby said main valve carried by said carriage member is urged against the pressure in said inlet compartment away from said main valve seat.

2. A temperature relief valve comprising an inlet compartment and an outlet compartment of substantially cup-shaped and adapted to be assembled with their open ends in abutting relation to form a valve housing, an inlet opening for said inlet compartment and an outlet for said outlet compartment, a main valve seat member fixed between the open ends of said inlet and outlet compartments and having a main valve seat extending into said inlet compartment, a hollow carriage member in said valve housing having one end thereof extending beyond said valve seat of said main valve member into said inlet compartment, a main valve carried at one end of said carriage member, a spring between said main valve seat member and said carriage member for normally urging the latter in a direction to seat said main valve on said main valve seat, an expansible chamber comprising a flexible bellows at the other end to said carriage member, a pilot valve seat at said other end of said carriage member opening into said expansible chamber, a temperature responsive means having a flexible bellows disposed within said carriage member and subject to the temperature of the fluid in said inlet compartment, a pilot valve at the other end of said flexible bellows of said temperature responsive means, spring means between said pilot valve and said expansible chamber for normally seating said pilot valve on said pilot valve seat, the cross-sectional area of the opening of said pilot valve seat being substantially less than the cross-sectional area of the opening of said main valve seat, said flexible bellows of said temperature responsive means at a predetermined temperature being adapted to expand to unseat said pilot valve and admit pressure from said inlet compartment into said expansible chamber, said expansible chamber having an effective area against which pressure admitted therein acts of substantially greater area than the area of said main valve subject to the pressure in said inlet compartment, whereby said main valve carried by said carriage member is urged against the pressure in said inlet compartment away from said main valve seat.

LEO J. KMIECIK.